(12) United States Patent
Sun et al.

(10) Patent No.: US 9,639,202 B2
(45) Date of Patent: May 2, 2017

(54) TOUCH DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Wenjia Sun, Beijing (CN); Hongli Zhu, Beijing (CN); Qing Ma, Beijing (CN); Daekeun Yoon, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 19 days.

(21) Appl. No.: 14/421,083

(22) PCT Filed: May 23, 2014

(86) PCT No.: PCT/CN2014/078301
§ 371 (c)(1),
(2) Date: Feb. 11, 2015

(87) PCT Pub. No.: WO2015/109702
PCT Pub. Date: Jul. 30, 2015

(65) Prior Publication Data
US 2015/0338985 A1 Nov. 26, 2015

(30) Foreign Application Priority Data
Jan. 21, 2014 (CN) .......................... 2014 1 0028166

(51) Int. Cl.
G06F 3/041 (2006.01)
G06F 1/16 (2006.01)

(52) U.S. Cl.
CPC .......... *G06F 3/0416* (2013.01); *G06F 1/1601* (2013.01); *G06F 3/0412* (2013.01)

(58) Field of Classification Search
None
See application file for complete search history.

(56) References Cited

U.S. PATENT DOCUMENTS

2008/0068342 A1* 3/2008 Chang .................. G06F 3/0412
345/173
2008/0309640 A1 12/2008 Hong
(Continued)

FOREIGN PATENT DOCUMENTS

CN 101324821 A 12/2008
CN 101751183 A 6/2010
(Continued)

OTHER PUBLICATIONS

International Search Report and Written Opinion of the International Searching Authority with Notice of Transmittal of the International Search Report and Written Opinion of PCT/CN2014/078301 in Chinese, mailed Sep. 29, 2014.
(Continued)

*Primary Examiner* — Joseph Haley
*Assistant Examiner* — Ifedayo Iluyomade
(74) *Attorney, Agent, or Firm* — Collard & Roe, P.C.

(57) ABSTRACT

A touch display device is provided to depress the chance that the touch display device generates bubble, mura or similar bad phenomena. The touch display device includes a touch screen (1) and a display panel (2) arranged opposite to each other, and at least two insert-fitting structures (3) located between the touch screen (1) and the display panel (2), and the touch screen (1) and the display panel (2) are connected with each other in an insert-fitting way through the insert-fitting structures (3).

18 Claims, 3 Drawing Sheets

(56) References Cited

U.S. PATENT DOCUMENTS

| | | | | |
|---|---|---|---|---|
| 2009/0257207 A1* | 10/2009 | Wang | ............... | G06F 1/1626 |
| | | | | 361/752 |
| 2010/0020045 A1* | 1/2010 | Walsh | ............... | G06F 3/0421 |
| | | | | 345/176 |
| 2011/0163975 A1 | 7/2011 | Li et al. | | |
| 2015/0062480 A1* | 3/2015 | Cho | ............... | G02F 1/133308 |
| | | | | 349/58 |

FOREIGN PATENT DOCUMENTS

| | | | |
|---|---|---|---|
| CN | 102012724 A | 4/2011 | |
| CN | 202394209 U | 8/2012 | |
| CN | 202563403 U | 11/2012 | |
| CN | 103777816 A | 5/2014 | |
| CN | 203673453 U | 6/2014 | |
| EP | 2 003 530 A2 | 12/2008 | |
| KR | 10-20130102130 | * 8/2013 | ....... G02F 1/133308 |

OTHER PUBLICATIONS

Chinese Office Action in Chinese Application No. 201410028166.4 mailed Feb. 5, 2016 with English translation.
Second Chinese Office Action in Chinese Application No. 201410028166.4 mailed Jun. 2, 2016 with English translation.

* cited by examiner

TOUCH DISPLAY DEVICE

CROSS REFERENCE TO RELATED APPLICATIONS

This application is the National Stage of PCT/CN2014/078301 filed on May 23, 2014, which claims priority under 35 U.S.C. §119 of Chinese Application No. 201410028166.4 filed on Jan. 21, 2014, the disclosure of which is incorporated by reference.

TECHNICAL FIELD

At least one embodiment of the present disclosure relates to a touch display device.

BACKGROUND

With the continuous improvement of the science and technology, touch display devices have been already widely used by millions of people and become people's frequently-used articles. The touch display devices, according to functions, mainly include the touch computer, the touch television, the touch cell phone, the touch notebook computer and the like. The touch display devices, according to structures, mainly include out-cell touch screen, in-cell touch screen and on-cell touch screen; and the out-cell touch screen mainly includes a display panel (i.e., panel) and a touch screen (i.e., touch assembly), and the touch screen separately achieves the touch function independent of the display panel.

In the field of large-size display, the touch display device mainly adopts an out-cell touch screen.

An out-cell touch display device known by the inventor is of full lamination type, that is, the display panel and the touch screen are bonded with each other through an optical adhesive, for example, an optically clear adhesive (short for OCA). Specifically, the entirety of a surface of the display panel, opposite to the touch screen, is provided with the optical adhesive, so that the display panel and the touch screen are fully bonded together. But large-area lamination easily causes the touch display device to produce bad phenomena, such as bubble, and the stress caused by large-area lamination can lead to progressive bubble and Newton's ring, so the touch display device formed in such a way can cause bad phenomena, such as mura, in the process of displaying images.

SUMMARY

Embodiments of present disclosure provide a touch display device to depress the chance that the touch display device generates bubble, mura or similar bad phenomena.

A touch display device provided by at least one embodiment of the present disclosure includes a touch screen and a display panel provided oppositely to each other, and at least two insert-fitting structures located between the touch screen and the display panel, and the touch screen and the display panel are connected with each other in an insert-fitting way through the insert-fitting structures.

In an example, the at least two insert-fitting structures include a first insert-fitting structure and a second insert-fitting structure, an inserting direction of the first and second insert-fitting structures is parallel to an edge of a side of the display panel, the first and second insert-fitting structures are separately located in regions corresponding to frame regions of the display panel, and a frame region where the first insert-fitting structure is located is opposite to that where the second insert-fitting structure is located.

In an example, the first insert-fitting structure and the second insert-fitting structure respectively include two connection parts, which fit with each other in an insertion-fitting way, one of which is fixed onto the touch screen, and the other of which is fixed onto the display panel.

In an example, in the two connection parts which fit with each other in an insertion-fitting way, the connection part fixed onto the touch screen includes an insert-fitting groove body extending along the inserting direction and including an insert-fitting groove, and an end of the insert-fitting groove body extends to an edge of the touch screen; and the connection part fixed onto the display panel includes an insert-fitting convex piece fitting a shape of the insert-fitting groove. Or, in the two connection parts which fit with each other in an insertion-fitting way, the connection part fixed onto the display panel includes an insert-fitting groove body extending along the inserting direction and including an insert-fitting groove, and an end of the insert-fitting groove body extends to an edge of the display panel; and the connection part fixed onto the touch screen includes an insert-fitting convex piece fitting a shape of the insert-fitting groove.

In an example, the insert-fitting groove includes a dovetail groove or a T-shaped groove.

In an example, a maximum height of a portion of each of the insert-fitting structures, which portion is located between the touch screen and the display panel, is equal to a vertical distance between the touch screen and the display panel.

In an example, the maximum height of the portion of each of the insert-fitting structures, which portion is located between the touch screen and the display panel, is from 2 mm to 3 mm.

In an example, portions of the first insert-fitting structure and the second insert-fitting structure, which portions are located between the touch screen and the display panel, are equal in height.

In an example, the touch display device further includes a retaining member located at an insertion entrance of the insert-fitting groove body.

In an example, the retaining member includes a fastener.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

The touch display device provided by at least one embodiment of the present disclosure is an out-cell touch screen. By providing at least two insert-fitting structures between a touch screen and a display panel which are opposite to each other so as to achieve an insert-fitting connection between the touch screen and the display panel, bad phenomena, such as bubble and mura, caused by using the adhesive in large area, can be effectively avoided, and the occurrence probability of the bad phenomena such as bubble and mura in the touch display device can be reduced. Additionally, at least one embodiment of the present disclosure may further achieve a touch display device in which the touch screen and the display panel can be assembled and detached more conveniently and rapidly.

Figure 1:
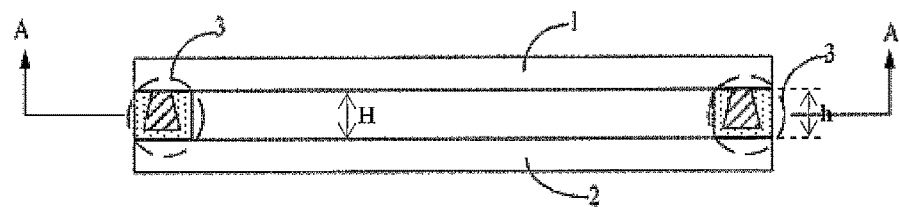
FIG. 1 is a schematic sectional view of a touch display device provided by an embodiment of present disclosure.

FIG. 1 is a schematic sectional view of a touch display device provided by an embodiment of present disclosure. The touch display device includes: a touch screen 1 and a display panel 2 which are opposite to each other; and at least two insert-fitting structures 3 located between the touch screen 1 and the display panel 2. The touch screen 1 and the display panel 2 are connected with each other in an insert-fitting way through the insert-fitting structures 3. For example, the insert-fitting structures 3 are provided to be opposite to each other.

In the touch display device provided by the embodiment of present disclosure, the touch screen 1 and the display panel 2 are connected with each other in an insert-fitting way through the insert-fitting structures 3. The manner of connecting the touch screen 1 and the display panel 2 through the insert-fitting structures 3, compared with the method of using an adhesive to achieve a large-area lamination, can avoid the bad phenomena such as bubble and mura. The embodiment of present disclosure may further achieve a touch display device in which the touch screen and the display panel can be assembled and detached more conveniently and rapidly.

The insert-fitting structure can be any connecting structure that can realize that the touch screen 1 and the display panel 2 may be combined into one piece and may also be detached at all times as required.

In at least one embodiment of the present disclosure, the insert-fitting structure, for example, may be achieved as a fastener-type structure or a slotting structure.

In at least one embodiment of the present disclosure, the fastener-type structure may be designed to be disposable or non-disposable. The disposable fastener-type structure is used in the situation where the assembled parts need not to be taken-down, and the non-disposable fastener-type structure is usually used in the situation where it's required to facilitate the disassembly. Furthermore, the fastener-type structure can adopt an annular or cantilever type structure.

The insert-fitting structure formed in the above-mentioned manner improves the firmness of the integrated structure formed after assembling the touch screen 1 and the display panel 2.

Descriptions will be made taking a slotting structure as an example of the insert-fitting structure, and obviously, embodiments of the present disclosure is not limited to the described structure.

Figure 2:
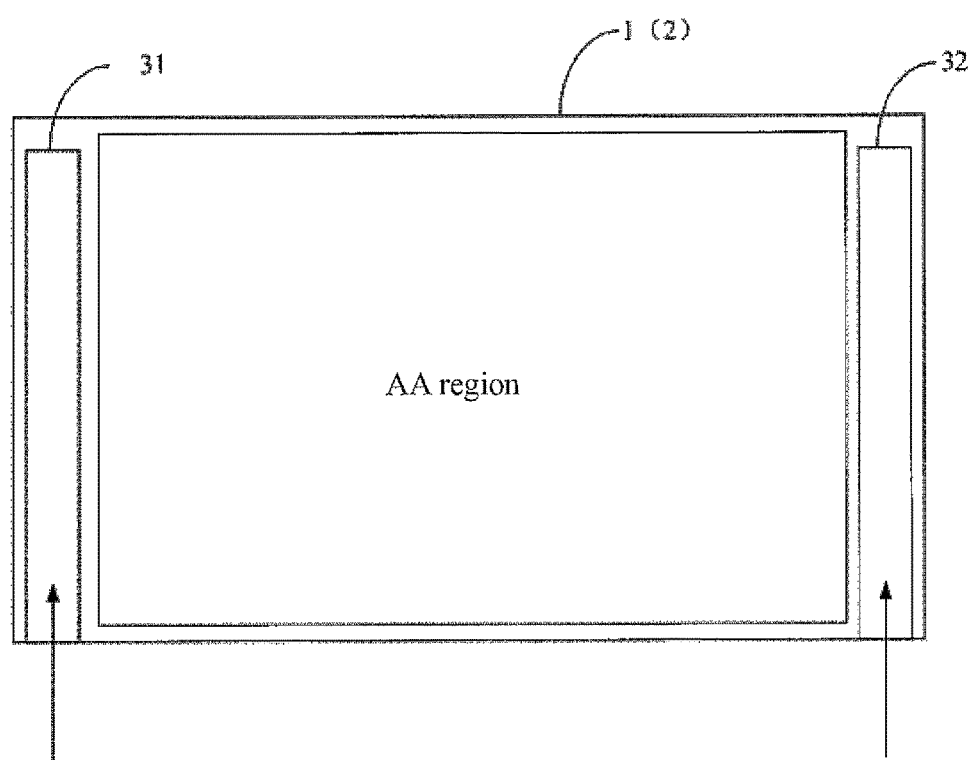
FIG. 2 is a sectional view in the A-A direction of the touch display device shown in FIG. 1.

FIG. 2 is a sectional view in the A-A direction of the touch display device shown in FIG. 1.

The insert-fitting structure of the touch display device includes a first insert-fitting structure 31 and a second insert-fitting structure 32, an inserting direction (the direction shown by the arrows in FIG. 2 is the inserting direction) of the first insert-fitting structure 31 and the second insert-fitting structure 32 is parallel to an edge of a side of the display panel 2.

The first insert-fitting structure 31 and the second insert-fitting structure 32 are respectively located at regions corresponding to frame regions of the display panel 2, the regions outside the AA region in FIG. 2 are frame regions, and the AA region, for example, includes a display area. The frame region where the first insert-fitting structure 31 is located and the frame region where the second insert-fitting structure 32 is located are opposite to each other with the display area located therebetween (that is, not adjacent to each other).

The inserting direction of the first insert-fitting structure 31 and the second insert-fitting structure 32, in the embodiment of present disclosure, is parallel to an extending direction of a side of the display panel 2; and the first insert-fitting structure 31 and the second insert-fitting structure 32 are respectively located at regions corresponding to frame regions of the display panel 2. Thus, the ratio that the first insert-fitting structure 31 and the second insert-fitting structure 32 occupy the entire area of the display panel is relatively small, and this avoids the bad phenomena, such as bubble and mura, caused by the large-area lamination between the touch screen and the display panel.

Generally, edges of opposite two sides of the display panel are parallel with each other, and accordingly, the inserting directions of all the insert-fitting structures in the embodiments of the present disclosure are parallel with each other.

For example, on the basis of the preceding embodiments, the first insert-fitting structure and the second insert-fitting structure respectively include two connection parts which fit with each other in an insertion-fitting way, one of the two connection parts which fit with each other in an insertion-fitting way is fixed onto the touch screen, and the other is fixed onto the display panel.

Further, in the two connection parts which fit with each other in an insertion-fitting way, the connection part fixed onto the touch screen is an insert-fitting groove body extending along the inserting direction and including an insert-fitting groove, an end of the insert-fitting groove body extends to an edge of the touch screen. The connection part fixed onto the display panel is an insert-fitting convex piece fitting the shape of the insert-fitting groove. The position where the insert-fitting groove body is fixed onto the touch screen corresponds to a position where the insert-fitting convex piece is fixed onto the display panel.

Alternatively, in the two connection parts which fit with each other in an insertion-fitting way, the connection part fixed onto the display panel is an insert-fitting groove body extending along the inserting direction and including an insert-fitting groove, an end of the insert-fitting groove body extends to an edge of the display panel. The connection part fixed onto the display panel is an insert-fitting convex piece fitting the shape of the insert-fitting groove. The position where the insert-fitting groove body is fixed onto the display panel corresponds to a position where the insert-fitting convex piece is fixed onto the touch screen.

Of course, each insert-fitting structure in at least one embodiment of the present disclosure may also present a predetermined angle in a direction perpendicular to the inserting direction. In this case, one example is that the first insert-fitting structure and the second insert-fitting structure respectively include a first connection part and a second connection part which fit with each other in an insertion-fitting way, and the first connection part and the second connection part are respectively an insert-fitting groove body and an insert-fitting convex piece; and the insert-fitting groove body is fixed onto the display panel (or the touch screen), and the insert-fitting convex piece is in a pivot connection with the touch screen (or the display panel).

For example, the above-mentioned first insert-fitting structure and the second insert-fitting structure respectively include two connection parts which fit with each other in an insertion-fitting way, one of the two connection parts which fit with each other in an insertion-fitting way is fixed onto the touch screen, and the other is fixed onto the display panel, so that a more reliable connection between the touch screen and the display panel is achieved.

In order to describe the first insert-fitting structure and the second insert-fitting structure shown in FIG. 2 more clearly, descriptions will be made with respect to the example in which the first insert-fitting structure includes a first connection part and a second connection part, and the first connection part is fixed onto the touch screen and the second connection part is fixed onto the display panel.

Figure 3:
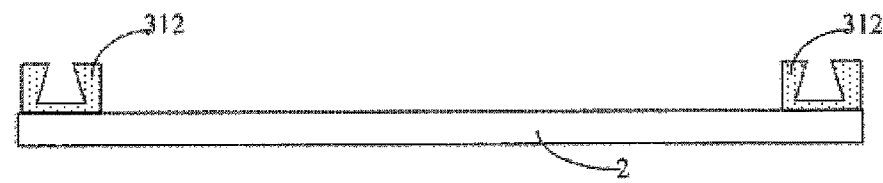
FIG. 3 is a sectional view showing a display panel and a second connection part fixed onto the display panel, provided by an embodiment of present disclosure.
Figure 4:
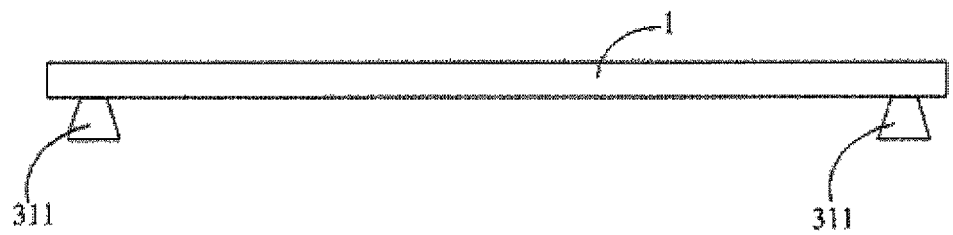
FIG. 4 is a sectional view showing a touch screen and a first connection part fixed onto the touch screen, provided by an embodiment of present disclosure.

FIG. 3 shows a sectional view of a display panel 2 and a second connection part 312 fixed onto the display panel 2; and FIG. 4 shows a sectional view of a touch screen 1 and a first connection part 311 fixed onto the touch screen 1.

For example, in the two connection parts which fit with each other in an insertion-fitting way (i.e., the first connection part 311 and the second connection part 312), the second connection part 312 fixed onto the display panel 2 is an insert-fitting groove body extending along the inserting direction shown in FIG. 2 and including an insert-fitting groove, and as shown in FIG. 2, an end of the insert-fitting groove body extends to an edge of the display panel. The first connection part 311 fixed onto the touch screen 1 is an insert-fitting convex piece fitting the shape of the insert-fitting groove.

The shape of the insert-fitting convex piece which matches the insert-fitting groove body to achieve an insert-fitting connection, and the shape of the insert-fitting groove of the insert-fitting groove body, fit each other, namely complement each other, so that it is not easy for them to be separated from each other in the direction perpendicular to the inserting direction.

The first connection parts 311 and the second connection parts 312 of the first insert-fitting structure 31 and the second insert-fitting structure 32, provided by at least one embodiment of the present disclosure, may be arranged in the touch display device in various ways. For example, the first connection parts 311 of the first insert-fitting structure 31 and the second insert-fitting structure 32 are both arranged on the touch screen (or the display panel), and the second connection parts 312 are both arranged on the display panel (or the touch screen).

Alternatively, the first connection part 311 of the first insert-fitting structure 31 and the first connection part 311 of the second insert-fitting structure 32 are respectively provided on the touch screen and on the display panel, and correspondingly, the second connection part 312 of the first insert-fitting structure 31 and the second connection part 312 of the second insert-fitting structure 32 are respectively provided on the display panel and on the touch screen.

In one embodiment, the first connection part 311 and the second connection part 312 are respectively arranged on two opposite surfaces of the combined touch screen and the display panel; the first connection part 311 and the second connection part 312 are carried out an insert-fitting operation according to the inserting direction, so that the first connection part 311 and the second connection part 312 are integrated into one piece in an insert-fitting way, at the same time, the touch screen and the display panel are integrated into one piece through the first connection part 311 and the second connection part 312 which are connected with each other in the insert-fitting way, and thus a touch display device is formed.

The first connection part 311 and the second connection part 312 can be combined more tightly when they are the insert-fitting groove body and the insert-fitting convex piece respectively.

Figure 5:
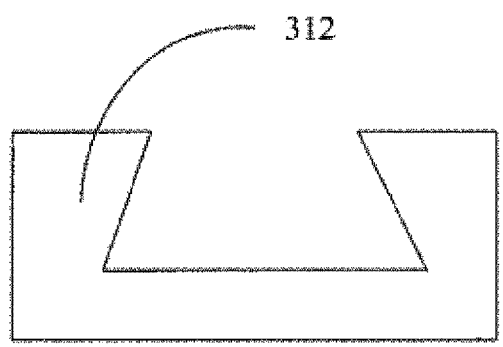
FIG. 5 is a partially enlarged schematic view showing an insert-fitting groove body having a dovetail groove, provided by an embodiment of present disclosure.
Figure 6:
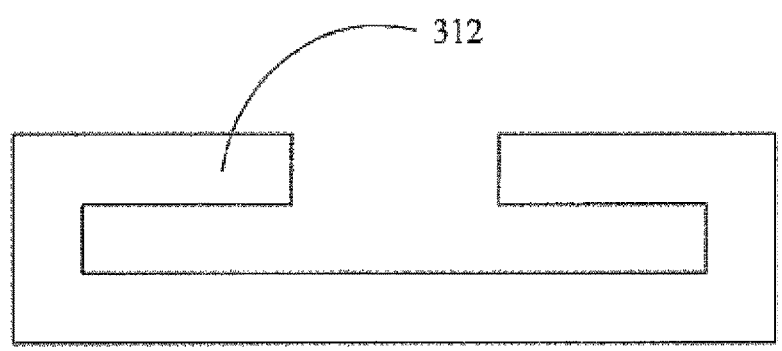
FIG. 6 is a partially enlarged schematic view showing an insert-fitting groove body having a T-shaped groove, provided by an embodiment of present disclosure.

In order to obtain a more reliable connection between the first connection part 311 and the second connection part 312, provided by the above embodiments, for example, the shape of the insert-fitting groove of the insert-fitting groove body includes a dovetail groove or a T-shaped groove. FIG. 5 is a partially enlarged schematic view showing an insert-fitting groove body including a dovetail groove, provided by an embodiment of present disclosure; FIG. 6 is a partially enlarged schematic view showing an insert-fitting groove body including a T-shaped groove, provided by an embodiment of present disclosure; the insert-fitting groove body 312 illustrated in FIG. 5 and provided with the shape of the insert-fitting groove being a dovetail groove can be referred to; and the insert-fitting groove body 312 illustrated in FIG. 6 and provided with the shape of the insert-fitting groove being a T-shaped groove can be referred to.

Each of the cases where the shape of the insert-fitting groove of the insert-fitting groove body is a dovetail groove or a T-shaped groove meets the requirement that the size of the opening of the groove is smaller than the width of the groove bottom; and the shape of the insert-fitting convex piece which matches the insert-fitting groove body to realize an insert-fitting connection, fit with, i.e., complement with, the shape of the dovetail groove or the T-shaped groove, so that both of them are not easily to be separated from each other in the direction perpendicular to the inserting direction.

Further, referring to FIG. 1, in at least one embodiment of the present disclosure, the maximum height h of the portion of the insert-fitting structure 3 located between the touch screen and the display panel is equal to the vertical distance H between the touch screen and the display panel, so that the insert-fitting convex piece can be completely inserted into the insert-fitting groove of the insert-fitting groove body, and this reduces the overall thickness of the touch display device and thus facilitates the realization of a lighter and thinner touch display device.

For example, the maximum height of the portion of the insert-fitting structure between the touch screen and the display panel is from 2 mm to 3 mm, namely, the distance between the touch screen and the display panel is from 2 mm to 3 mm.

Further, in at least one embodiment of the present disclosure, the portions of the first insert-fitting structure and the second insert-fitting structure located between the touch screen and the display panel are equal in height, so as to make each part of the touch screen have an equal distance from the display panel.

Figure 7:
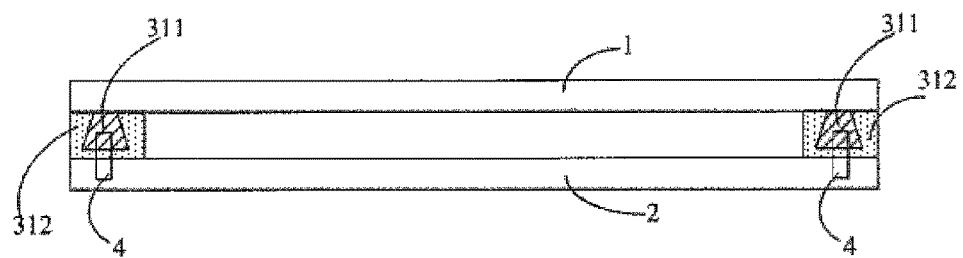
FIG. 7 is a schematic sectional view showing a touch display device having a retaining member, provided by an embodiment of present disclosure.

In at least one embodiment of the present disclosure, as the structures illustrated in FIGS. 3 and 4, when the touch screen and the display panel are integrated into one piece through the insert-fitting structure, i.e., when the relative position of the first connection part 311 and the second connection part 312 is determined, in order to prevent the relative shift of the touch screen and the display panel, as illustrated in FIG. 7, the touch display device further includes a retaining member 4 located at an insertion entrance of the insert-fitting groove body. For example, the retaining member can be any structure that can fasten the touch screen and the display panel, and specific structure thereof is not limited, for example, the retaining member is a fastener.

It is to be noted that, in at least one embodiment of the present disclosure, the insert-fitting groove body provided on the display panel can be a structure independent of the display panel, for example, the insert-fitting groove body is adhesively fixed onto the display panel; and the insert-fitting groove body can also be a concave structure made on the display panel by utilizing the structure of the display panel per se, for example, the insert-fitting groove bodies can be achieved by punching out parallel grooves in the metal material of the frame regions themselves of the display panel, and this, for example, can closely fit the display panel and the touch screen.

When the insert-fitting structure includes a plurality of fastener-type structures, each fastener-type structure includes the first connection part and the second connection part, for example, the first connection part is fixed onto the touch screen, and the second connection part is fixed onto the display panel. Moreover, the above-mentioned plurality of fastener-type structures are, for example, evenly distributed in frame regions of the display panel, or alternatively, for example, only distributed in frame regions at two opposite sides of the display panel. Of course, the above-mentioned plurality of fastener-type structures may also be unevenly distributed in the frame regions of the display panel, so long as the display panel and the touch screen can be integrated into one piece.

In the touch display device provided by at least one embodiment of the present disclosure, at least two insert-fitting structures are provided between the touch screen and the display panel arranged oppositely to each other, the inserting directions of the insert-fitting structures are parallel to each other, and the touch screen and the display panel are connected with each other in an insert-fitting way through the insert-fitting structures. This can effectively avoid the bad phenomena such as bubble and mura, caused by using an adhesive in a large area, and further reduce the chance that the touch display device generates bubble, mura or similar bad phenomena. The embodiment of present disclosure may further achieve a touch display device in which the touch screen and the display panel can be assembled and detached more conveniently and rapidly.

In at least one embodiment of the present disclosure, the display panel may be a liquid crystal display (LCD) panel, an organic light-emitting diode (OLED) display panel, a light-emitting diode (LED), a plasma display panel (PDP), or the like. In at least one embodiment of the present disclosure, the touch screen may be a resistance-type, capacitance-type, infrared type or surface acoustic wave type touch screen and so on. Embodiments of present disclosure do not limit the specific types of the display panel and the touch screen, as long as they can be combined with each other.

The present application claims the benefit of Chinese Patent Application No. 201410028166.4, filed on Jan. 21, 2014, which is hereby entirely incorporated by reference as a part of the present application.

Obviously, the skilled in this art can make various modifications and variations to the present disclosure without departing from the spirit and scope of the present disclosure. So, if these modifications and variations belong to the scope of the claims of the present disclosure and their equivalents, then the present disclosure is intended to cover these modifications and variations.

What is claimed is:

1. A touch display device, comprising a touch screen and a display panel provided oppositely to each other, and at least two insert-fitting structures located between the touch screen and the display panel, wherein the touch screen and the display panel are connected with each other in an insert-fitting way through the insert-fitting structures;

wherein the at least two insert-fitting structures comprise a first insert-fitting structure and a second insert-fitting structure;

wherein the first insert-fitting structure comprises a first insert-fitting groove body with a first insert-fitting groove and a first insert-fitting convex piece fitting a shape of the first insert-fitting groove, and a size of an opening of the first insert-fitting groove is smaller than a size of a bottom of the first insert-fitting groove;

wherein the second insert-fitting structure comprises a second insert-fitting groove and a second insert-fitting convex piece fitting a shape of the second insert-fitting groove, and a size of an opening of the second insert-fitting groove is smaller than a size of a bottom of the second insert-fitting groove; and wherein the touch display device further comprises at least a first retaining member and second retaining member, the first retaining member is configured to be inserted into both the first insert-fitting groove body and the first insert-fitting convex piece to fasten the first insert-fitting groove body with the first insert-fitting convex piece, and the second retaining member is configured to be inserted into both the second insert-fitting groove body and the second insert-fitting convex piece to fasten the second insert-fitting groove body with the second insert-fitting convex piece.

2. The touch display device according to claim 1, wherein a first inserting direction of the first insert-fitting structure and a second inserting direction of the second insert-fitting structure are parallel to an edge of a side of the display panel, the first insert-fitting structure and the second insert-fitting structure are separately located in regions corresponding to frame regions of the display panel, and a frame region where the first insert-fitting structure is located is opposite to that where the second insert-fitting structure is located.

3. The touch display device according to claim 2, wherein the first insert-fitting groove body and the second insert-fitting groove body are fixed onto the touch screen, and the first insert-fitting convex piece and the second insert-fitting convex piece are fixed onto the display panel.

4. The touch display device according to claim 3, wherein the first insert-fitting groove body extends in the first inserting direction, an end of the first insert-fitting groove body extends to an edge of the touch screen, the second insert-fitting groove body extends in the second inserting direction that is parallel with the first inserting direction, and an end of the second insert-fitting groove body extends to the edge of the touch screen; or the first insert-fitting groove body extends in the first inserting direction, an end of the first insert-fitting groove body extends to an edge of the display panel, the second insert-fitting groove body extends in the second inserting direction that is parallel with the first inserting direction, and an end of the second insert-fitting groove body extends to the edge of the display panel.

5. The touch display device according to claim 4, wherein each of the first insert-fitting groove and the second insert-fitting groove comprises a dovetail groove or a T-shaped groove.

6. The touch display device according to claim 3, wherein a maximum height of a portion of the at least two insert-fitting structures, which portion is located between the touch screen and the display panel, is equal to a vertical distance between the touch screen and the display panel.

7. The touch display device according to claim 6, wherein the maximum height of the portion of the at least two insert-fitting structures, which portion is located between the touch screen and the display panel, is from 2 mm to 3 mm.

8. The touch display device according to claim 2, wherein portions of the first insert-fitting structure and the second insert-fitting structure, which portions are located between the touch screen and the display panel, are equal in height.

9. The touch display device according to claim 1, wherein each of the first retaining member and the second retaining member comprises a fastener.

10. The touch display device according to claim 5, wherein a maximum height of a portion of the at least two insert-fitting structures, which portion is located between the touch screen and the display panel, is equal to a vertical distance between the touch screen and the display panel.

11. The touch display device according to claim 10, wherein the maximum height of the portion of the at least two insert-fitting structures, which portion is located between the touch screen and the display panel, is from 2 mm to 3 mm.

12. The touch display device according to claim 3, wherein portions of the first insert-fitting structure and the second insert-fitting structure, which portions are located between the touch screen and the display panel, are equal in height.

13. The touch display device according to claim 4, wherein portions of the first insert-fitting structure and the second insert-fitting structure, which portions are located between the touch screen and the display panel, are equal in height.

14. The touch display device according to claim 5, wherein portions of the first insert-fitting structure and the second insert-fitting structure, which portions are located between the touch screen and the display panel, are equal in height.

15. The touch display device according to claim 6, wherein portions of the first insert-fitting structure and the second insert-fitting structure, which portions are located between the touch screen and the display panel, are equal in height.

16. The touch display device according to claim 7, wherein portions of the first insert-fitting structure and the second insert-fitting structure, which portions are located between the touch screen and the display panel, are equal in height.

17. The touch display device according to claim 10, wherein portions of the first insert-fitting structure and the second insert-fitting structure, which portions are located between the touch screen and the display panel, are equal in height.

18. The touch display device according to claim 11, wherein portions of the first insert-fitting structure and the second insert-fitting structure, which portions are located between the touch screen and the display panel, are equal in height.

* * * * *